US011551100B1

(12) United States Patent
Ernest

(10) Patent No.: US 11,551,100 B1
(45) Date of Patent: Jan. 10, 2023

(54) SELF-OPTIMIZED SYSTEM AND METHOD USING A FUZZY GENETIC ALGORITHM

(71) Applicant: Thales S.A., Courbevoie (FR)

(72) Inventor: Nicholas Ernest, Liberty Township, OH (US)

(73) Assignee: Thales S.A., Courbevoie (FR)

( * ) Notice: Subject to any disclaimer, the term of this patent is extended or adjusted under 35 U.S.C. 154(b) by 643 days.

(21) Appl. No.: 16/693,892

(22) Filed: Nov. 25, 2019

Related U.S. Application Data

(63) Continuation of application No. 15/248,638, filed on Aug. 26, 2016, now Pat. No. 10,489,713.

(60) Provisional application No. 62/209,937, filed on Aug. 26, 2015.

(51) Int. Cl.
| | |
|---|---|
| *G06N 3/12* | (2006.01) |
| *G06N 5/04* | (2006.01) |
| *G06N 5/02* | (2006.01) |
| *G06N 3/02* | (2006.01) |

(52) U.S. Cl.
CPC .............. *G06N 3/126* (2013.01); *G06N 3/12* (2013.01); *G06N 5/022* (2013.01); *G06N 5/048* (2013.01); *G06N 3/02* (2013.01)

(58) Field of Classification Search
CPC .......... G06N 3/126; G06N 3/12; G06N 5/022; G06N 5/048; G06N 3/02
See application file for complete search history.

(56) References Cited

U.S. PATENT DOCUMENTS

| | | |
|---|---|---|
| 5,774,630 A | 6/1998 | Lee et al. |
| 6,067,496 A | 5/2000 | Benoliel et al. |
| 6,411,944 B1 | 6/2002 | Ulyanov |
| 6,430,544 B1 | 8/2002 | Childress |
| 6,549,830 B2 | 4/2003 | Harada et al. |
| 6,735,576 B1 | 5/2004 | Kaji et al. |
| 6,748,574 B2 | 6/2004 | Sasagawa et al. |
| 6,895,286 B2 * | 5/2005 | Kaji ................... G05B 13/0265 700/47 |
| 7,251,638 B2 | 7/2007 | Fujii et al. |
| 7,437,336 B2 | 10/2008 | Grefenstette |

(Continued)

FOREIGN PATENT DOCUMENTS

CN 104217252 B * 1/2018

OTHER PUBLICATIONS

Attia, A-F., et al., "Adaptation of genetic algorithms for optimization problem solving," In 7th International Conference on Soft Computing, Mendel, 2001, pp. 36-41.

(Continued)

*Primary Examiner* — Arvin Eskandarnia
(74) *Attorney, Agent, or Firm* — Frost Brown Todd LLP

(57) ABSTRACT

The present disclosure describes a system and method for improving the way computing devices execute genetic algorithms. A fuzzy logic controller takes various properties of the genetic algorithm (such as the diversity of the population, the performance history of the algorithm in terms of time-efficiency and/or effectiveness at improving the best fitness function results, and available computing resources) to dynamically manage the parameters of the genetic algorithm. In some embodiments, the fuzzy inference system that provides parameters to the genetic algorithm is itself controlled by another fuzzy inference system.

7 Claims, 7 Drawing Sheets

(56) References Cited

U.S. PATENT DOCUMENTS

| | | | |
|---|---|---|---|
| 7,444,309 | B2 | 10/2008 | Branke et al. |
| 9,077,491 | B2 | 7/2015 | Mar et al. |
| 10,248,675 | B2 | 4/2019 | Birdwell et al. |
| 10,489,713 | B1 | 11/2019 | Ernest |
| 2004/0077090 | A1 | 4/2004 | Short |
| 2006/0293817 | A1 | 12/2006 | Hagiwara et al. |
| 2009/0210366 | A1 | 8/2009 | Sakata et al. |
| 2012/0053970 | A1 | 3/2012 | Bhamidipaty et al. |
| 2017/0278008 | A1 | 9/2017 | Clark et al. |

OTHER PUBLICATIONS

Brehm, T., et al., "Hybrid Fuzzy Logic PIDS Controller," Dept. of Electrical Engineering, Wright State University, Dayton, OH, Jul. 1994, 11 pgs.

Chen, P., et al., "A fuzzy genetic algorithm for QoS multicast routing," Computer Communications, 2003, 26(6):506-512.

Clark, M.A., et al., Poster: Hybrid Representation of Rule-Based Systems, Poster, Conference, Apr. 14-16, 2015, pp. 287-288, HSCC'15, Seattle, Washington.

Ernest, N.D., "Genetic Fuzzy Trees for Intelligent Control of Unmanned Combat Aerial Vehicles," Dissertation, College of Engineering and Applied Science, University of Cincinnati, Mar. 2015, 151 pgs.

Guo, H., et al., "Dynamic Fuzzy Logic Control of Genetic Algorithm Probabilities," Journal of Computers, 2014, 9(1):22-27.

Herrera, F., et al., "Adaptation of genetic algorithm parameters based on fuzzy logic controllers," Genetic Algorithms and Soft Computing, 1996, 8:95-125.

Herrera, F., et al., "Fuzzy Genetic Algorithms: Issues and Models," Technical Report DESSAI-98116, Dept. of Computer Science and A.I., University of Granada, 1998, 25 pgs.

Liu, H., et al., "Hybrid fuzzy-genetic algorithm approach for crew grouping," $5^{th}$ International Conference on Intelligent Systems Design and Applications (ISDA'05), IEEE, 2005, 6 pgs.

MathWorks Global Optimization Toolbox, MATLAB® Programming Language, Mar. 9, 2015, downloaded from www.mathworks.com/help/gads/index.html, Jun. 5, 2018, 14pgs.

Rattan, K.S., et al., "KM-LOGIC: A Computationally Efficient, Real-Time MIMO Fuzzy Inference System," Air Force Research Laboratory, Wright-Patterson AFB, Ohio, 2015, 26 pgs.

Rattan, K.S., et al., Design and Analysis of a Multistage Fuzzy PID Controller, Article; Conference, Jul. 1-3, 2015, pp. 5726-5731, 2015 American Control Conference, Chicago, Illinois.

Sarma, K.C., "Fuzzy discrete multicriteria cost optimization of steel structures using genetic algorithm," Diss. The Ohio State University, 2001, 275 pgs.

Shaout, A., et al., "Job scheduling using fuzzy load balancing in distributed system," Electronics Letters, Oct. 1998, 34(20): 2 pgs.

Sharma, S.K., et al., "Genetic evolution: A dynamic fuzzy approach," Ninth IEEE International Conference on Fuzzy Systems, FUZZ-IEEE 2000 (Cat. No. 00CH37063), 2000, vol. 2.

Valdez, F., et al., "Modular Neural Networks architecture optimization with a new nature inspired method using a fuzzy combination of Particle Swarm Optimization and Genetic Algorithms," Information Sciences, 2014, 270:143-153, 11 pgs.

Voget, S., et al., "Multidimensional optimization with a fuzzy genetic algorithm," Journal of Heuristics, 1998, 4(3):221-244.

Ward Systems Group, Inc., GeneHunter, 2007, downloaded from http://www.wardsystems.com/genehunter.asp, Jun. 5, 2018, 11 pgs.

Watanabe, H., et al., "A VLSI Fuzzy Logic Controller with Reconfigurable, Cascadable Architecture," IEEE Journal of Solid-State Circuits, 1990, 25(2):376-382.

\* cited by examiner

SELF-OPTIMIZED SYSTEM AND METHOD USING A FUZZY GENETIC ALGORITHM

CROSS-REFERENCE TO RELATED APPLICATIONS

This application claims priority to and is a continuation of U.S. Nonprovisional patent application Ser. No. 15/248,638, filed on Aug. 26, 2016, having title "SELF-OPTIMIZED SYSTEM AND METHOD USING A FUZZY GENETIC ALGORITHM"; which was a nonprovisional of U.S. Provisional Patent Application No. 62/209,937, filed on Aug. 26, 2015, with title "ARTIFICIAL INTELLIGENCE CREATION AND OPTIMIZATION," the whole of each document being incorporated herein by reference.

FIELD

The present systems and methods relate to computer systems based on specific computational models. More specifically, the present systems and methods relate to computer systems that use fuzzy logic to improve the functioning of the computer itself.

BACKGROUND

Neural networks are mathematics-intense methods of intelligently solving complex problems. Fuzzy control systems, in contrast, rely on expert knowledge to categorize the values of the inputs and outputs into groups and then apply if-then rules to the combinations of these input and output groups to effectively remove the math from the problem and replace it with expert knowledge. This practice discretizes the control solution space into a range of possible linguistic terms and their combinations. If we implement a search heuristic such as a Genetic Algorithm (GA) over this fuzzy solution space, we can even forgo the expert knowledge. This methodology is referred to as a GFS.

The GA is the engine of the GFS. This search algorithm methodology is based on the theory of evolution and survival of the fittest. Potential solutions are encoded in the algorithm and referred to as "chromosomes" or "strings." Each of these chromosomes is then treated like an organism, and a population of these organisms is created. The organisms are evaluated over some "fitness" function and given a relative fitness value. "Breeding" occurs across the generation, favoring the more fit organisms, and a new generation is created. This process continues for some number of generations or until performance of the system has reached some predefined goal. For some problems, the desired, or even optimal, performance levels are known, and thus if the process reaches this level of performance, it can stop. However, most AI type problems cannot be handled in this manner, and instead some arbitrary number of generations for the run is determined as a function of both the solution space and the computational cost of running each generation.

A multitude of GA software implementations exist. Some of the more popular commercial implementations are the GA implemented in Mathworks' Global Optimization Toolbox for the MATLAB® programming language (http://www.mathworks.com/help/gads/index.html) and Ward Systems Group's GENEHUNTER® (http://www.wardsystems.com/genehunter.asp). Many non-commercial implementations have been written in many different languages, each with its own built-in feature set. If properly designed, GAs can be effective in solving problems that have many local optima, or values that are better than similar solutions, but not quite the optimal, or best over the whole solution space. The types of problems GAs are employed to solve typically have a very simple fitness function, but GAs can have scalability issues when the complexity of each chromosome or organism becomes quite high.

DESCRIPTION

Figure 1:
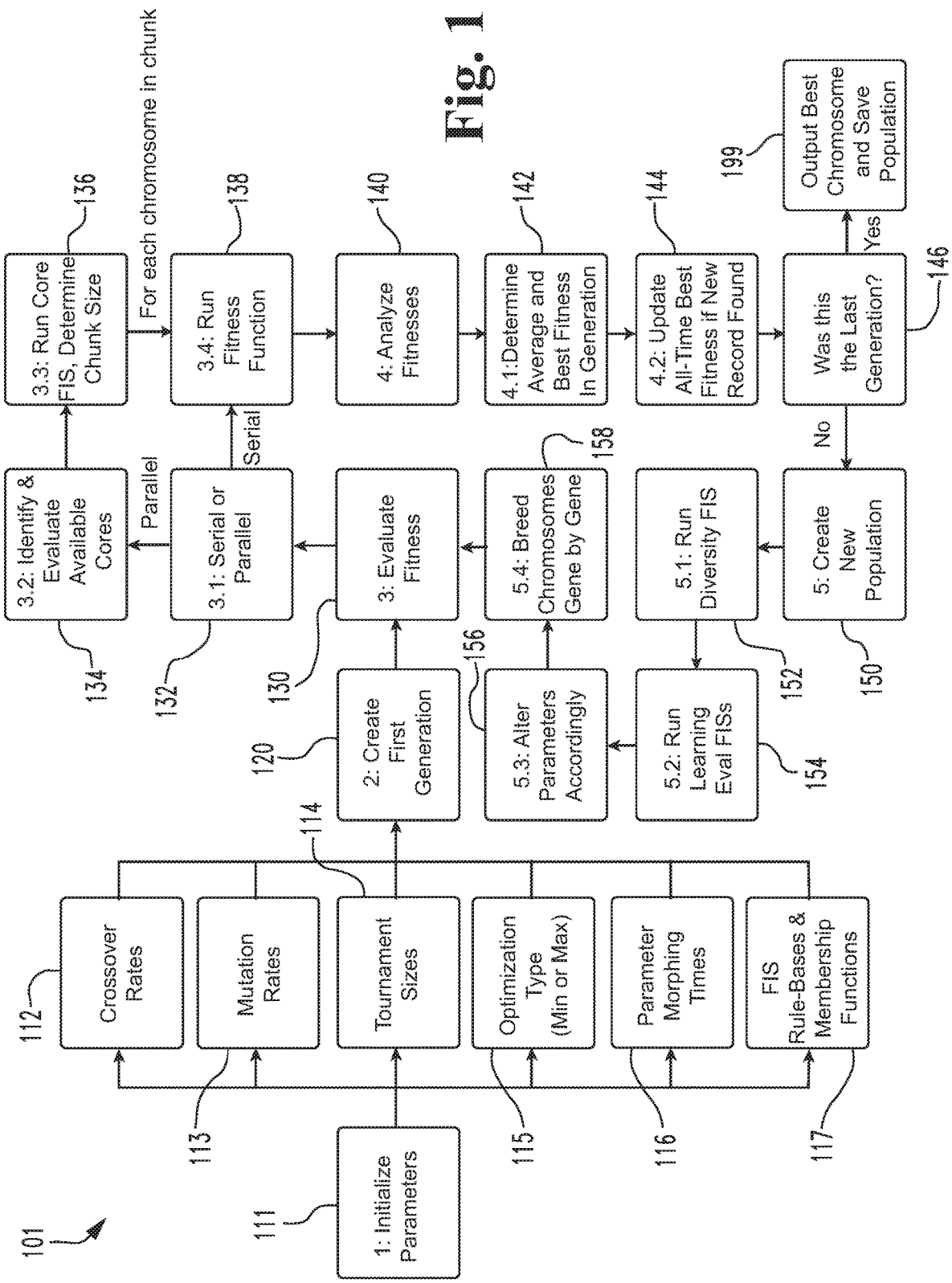
FIG. 1 is a flowchart illustrating internal operation of a first implementation of a GFT-optimized GA.

For the purpose of promoting an understanding of the principles of the present invention, reference will now be made to the embodiment(s) illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

This disclosure presents a novel type of Artificial Intelligence (AI), the Genetic Fuzzy Tree (GFT), and applications thereof. The GFT is an evolution of the Genetic Fuzzy System (GFS) methodology that uses fuzzy control to intelligently solve problems, in distinction from alternative, more mathematical methods such as neural networks.

The necessity for an advanced GA in order to function inside the new GFT methodology was the driving force for creation of the present system. In a GFS, a GA creates and optimizes a Fuzzy Inference System (FIS), or a controller based on fuzzy control. Each chromosome in this GA defines an FIS, and the FIS it creates must be evaluated to evaluate each chromosome's fitness. If the problem is a complex robotic control simulation, for example, evaluating each chromosome can be quite computationally expensive. The more complex the problem, the more inputs and outputs there may be. The complexity of the FIS increases exponentially, and thus standard GAs quickly become computationally intractable.

The GFT methodology allows the same type of solution to be applied to incredibly complex problems, with hundreds or even thousands of inputs and outputs. One particular GFT implementation takes under 24 hours to train and learn. If the exact same system were implemented using the traditional GFS structure, it would take an estimated $10^{\wedge}(3.46\times$ 10^(106)) years to train and learn on the most powerful supercomputer in the United States.

A standard-structure GA was used for a first, experimental GFT implementation. This software was similar to earlier systems in terms of structure, but used a custom, highly optimized GA. This GA was compared with a select few other GAs, and it outperformed them all. It was noted that certain supposed optimal parameters of GAs widely agreed upon in the scientific community were actually found to be quite suboptimal, at least in the context of complicated problems with many local optima, some of which are perfectly acceptable solutions, but not true global optima (as is the case in many artificial intelligence type problems).

Some parameters that vary among modern GAs include:
Population Size: How many chromosomes are in the population?
Crossover Type(s): What happens when two chromosomes reproduce together to form an offspring?
Mutation Type(s): What happens when a breeding result is chosen to mutate?
Polling Type: How are chromosomes selected for breeding?

The custom GA in the experimental system had all finely tuned parameters that changed with the number of generations, so the GA could focus on high performance in the most important portion(s) of the solution at each stage of the overall process, like a car changes gears.

However, this highly tuned GA, with higher performance than all other public algorithms, was not sufficient for the intended implementation context. This led to the realization that an evolutionary system that could run recursively, that is, learn to learn, might yield notable improvements in performance. This system has a GFT-optimizing engine that may have one or more of the following characteristics:

the ability to manage and manipulate extremely long chromosomes, each being made up of many different sections, or "genes";
the ability to have multiple populations of populations of chromosomes, rather than at most a single population of populations—some embodiments have "planets" made up of different "islands," or isolated sub-populations, as well as "systems" made up of different "planets," and "galaxies" made up of different "systems," where the chromosomes in a particular "island," "planet," "system," or "galaxy" do not breed with those in other ones (at least at particular stages);
the ability to incorporate "epochs" or stages of the learning process, where rules governing the environment vary as a function of what generation the entire system is at;
the ability to perform "emissary-style immigration" between different populations through some of the epochs, and combine sub-populations into meta-populations in later epochs;
the ability to intelligently monitor qualities of each population of chromosomes, such as diversity, exchange rates with each other population, and fitness histories;
the ability to utilize Fuzzy Logic systems to perform modifications to populations' parameters to optimize diversity and the time it takes to reach quality solutions, as a function of the complexity of the problem;
different possible values for each gene (for example, some will be binary (True or False), an integer (for example, in the range 0-10), or a string (series of alpha-numeric characters) containing only letters, only symbols, or both);
breeding mechanisms that are specialized to operate on individual genes separately, depending on the type of values that gene can contain;
ability to intelligently use parallel resources (whether in a single machine or across a distributed computing cluster) for applying the fitness function to each chromosome;
ability to run recursive training sessions on itself through a given training portfolio of problems in order to reach incredibly high levels of optimizations for all internal parameters and Fuzzy Logic systems;
extreme levels of optimization for the GA's many parameters in order to minimize the number of generations needed to reach high levels of performance.

Thus the presently disclosed GFT was made, serving as the GA for GA-optimized systems such as the GFT.

Generally, one form of the present system is a GFT that serves as the GA for GA-optimized systems such as a GFT. That is, the higher-level GFT manages the parameters for the GA (which might be another, lower-level GFT).

The flowchart of FIG. 1 illustrates operation of the higher-level GFT 101. At block 111, the system initializes its adjustable parameters. In some embodiments these are pre-defined, while in others they are intelligently obtained using methods described herein. In this embodiment, crossover rates 112, mutation rates 113, tournament sizes 114, and parameter morphing times 116 are all arrays of length 10 by default, with the system using the sequence of values in each array as the generations proceed (see below). The crossover rate 112 for a given generation dictates the odds of two chromosomes, once selected for breeding, successfully creating an offspring. The mutation rate 113 for a generation similarly represents the odds of a chromosome undergoing a mutation, or structured change to its own chromosome, during breeding. The present system utilizes tournament-style polling, where a number of chromosomes are selected from the generation at random, and the chromosome with the highest fitness in this selection is chosen for breeding. Other implementations will use different polling techniques as will occur to those skilled in the art. In this embodiment, tournament size 114 is the percentage of the population size that is randomly polled for each tournament for a given generation. Normally in GAs these values are static, but the present system utilizes different parameters through the run, dictated by the parameter morphing times array 116, which lists at what proportion of the maximum number of generations these parameters all change to their next value. The optimization type parameter 115 in this embodiment simply describes whether the system should seek to minimize or maximize the fitness scores, though other embodiments might implement more complex optimization types as will occur to those skilled in the relevant art in view of this disclosure. Lastly, this system has FISs as part of its makeup; namely, in this embodiment, a fuzzy tree 117. The if-then rule bases and shape of the (preferably triangular) membership functions are defined here as well.

As an example, the following pseudocode is used in this exemplary embodiment to poll the population of a particular generation for breeding using the tournament style of polling:

For range (0:PopulationSize)
  Tournament=RandomSet(Population, TournamentSize)
  TournamentWinner=BestFitness(Tournament)
  (Tournament winner goes on to breed).

Block 120 is creation of the first generation's population. Some embodiments use a purely randomly generated population as the first generation, while others seed the first generation with semi-random chromosomes. With a goal of being a universally applicable intelligent search AI, many embodiments of the present system make no assumptions regarding the initial population and instead creates a random generation. When an AI utilizes the system for learning, it takes three objects as inputs: the lengths of each gene in the chromosome, the corresponding possible values of each gene, and the fitness function. When it creates the first population, the system creates each chromosome gene-by-gene. In this exemplary system, the length of the chromosome is simply the sum of the number of elements in each gene, and the value of each element is encoded as one of the following types:

TABLE 1

Encoding of Elements in Genes

| Encoded Type | Meaning |
|---|---|
| 0 | Only one element for each integer up to length |
| Positive Integer | Random integer between 0 and input |
| "abc" | Any alphabetical character |
| "+−*/" | Any symbolic character |
| "abc+−*/" | Any alphabetical or symbolic character |
| "abc123" | Any alphanumeric character |
| "abc+−*/123" | Any alphabetical, numerical, or symbolic character |

Each input type in this table is rather self-explanatory except for the first. When a gene is encoded as a 0, the gene is created as a permuted array of all integers from 0 to (1−length of gene). For example, if a gene is specified to have length 4 and max value input of 0, the gene will be an array of length 4 with one of each value [0, 1, 2, 3] inside it in random order. A random number generator is applied to create every element in each gene, then one instance of each gene is concatenated to form a chromosome. The following pseudocode shows some examples of how to create this first random generation of chromosomes for the first two types of genes shown in the table above.

Gene 1
  Gene Type: 0
  Gene Length: 10
  Random Gene=RandomPermutation(0:9)
Gene 2
  Gene Type: 5
  Gene Length: 20
  For Index in range(0:19)
    Random Gene[Index]=RandomNumber(0:4)

In another situation, that last example could be semi-randomly generated by the following modifications:

Gene Input: 5
Gene Length: 20
For Index in range(0:19)
  If Index<5
    Random Gene[Index]=2
  Else
    Random Gene[Index]=RandomNumber(0:4)

This process would cause the first 5 elements in that gene to be the value 2. Genes for certain problems could be seeded in this way to some benefit. For example, if the operator is applying GFT 101 to a fuzzy system of some sort and strongly believes, but cannot guarantee, that a particular if-then rule could be optimal, this rule could be seeded in the population rather than hardcoded in the fuzzy system. This could have a net effect of reducing training time by seeding that genetic material into some or all of the population at the first generation. While the system can cope with this tampering, before interfering with the higher-level GFT process the operator should have a clear reason for doing so and, in general, anything that can be known a priori as fact should be hard coded rather than seeded.

Block 130 marks a significant portion of the system's capabilities: it can intelligently use parallel resources, whether they be a single or multi-core CPU, or a LAN- or WAN-based distributed computing cluster. The system may even serve as the "Mother AI" for a company's operations, in which case for security purposes the system might eschew internet-facing resources. In other embodiments, internet-accessible resources will be used, too.

First, the system polls for the number of CPUs available to it. (See block 132.) If there is only one, and the CPU aboard the system's server is only single-core, the fitness function is run in serial for each chromosome in the population (block 138). However, if there are more than one, or if the native CPU is multi-core, the system evaluates the CPUs at its disposal (block 134), including those aboard the system's server and those of any connected clients. The client is a simple script that connects to the server, giving the number of CPUs that can be accessed by the system and their specifications as well as the amount of RAM aboard the client. Note that comprehending hyperthreaded cores is handled client-side in the present embodiment, and the present embodiment does not have GPU capabilities due to the complex simulations utilized for fitness functions. In other implementations, GPU resources will be used instead or in addition.

As the present implementation of the system typically runs 24/7 at its current production facility and is meant to run on a very contested distributed network, or on a network containing workstations with developers actively working on them during the day; not every core will be sitting at 0% utilization with all of its computational resources ready to process fitness functions. Additionally, the exact performance of each core can vary for any number of reasons, most notably due to changes in the availability of RAM. For these reasons, the system records the average time each core took to process each chromosome's fitness for the past few generations.

Figure 2:
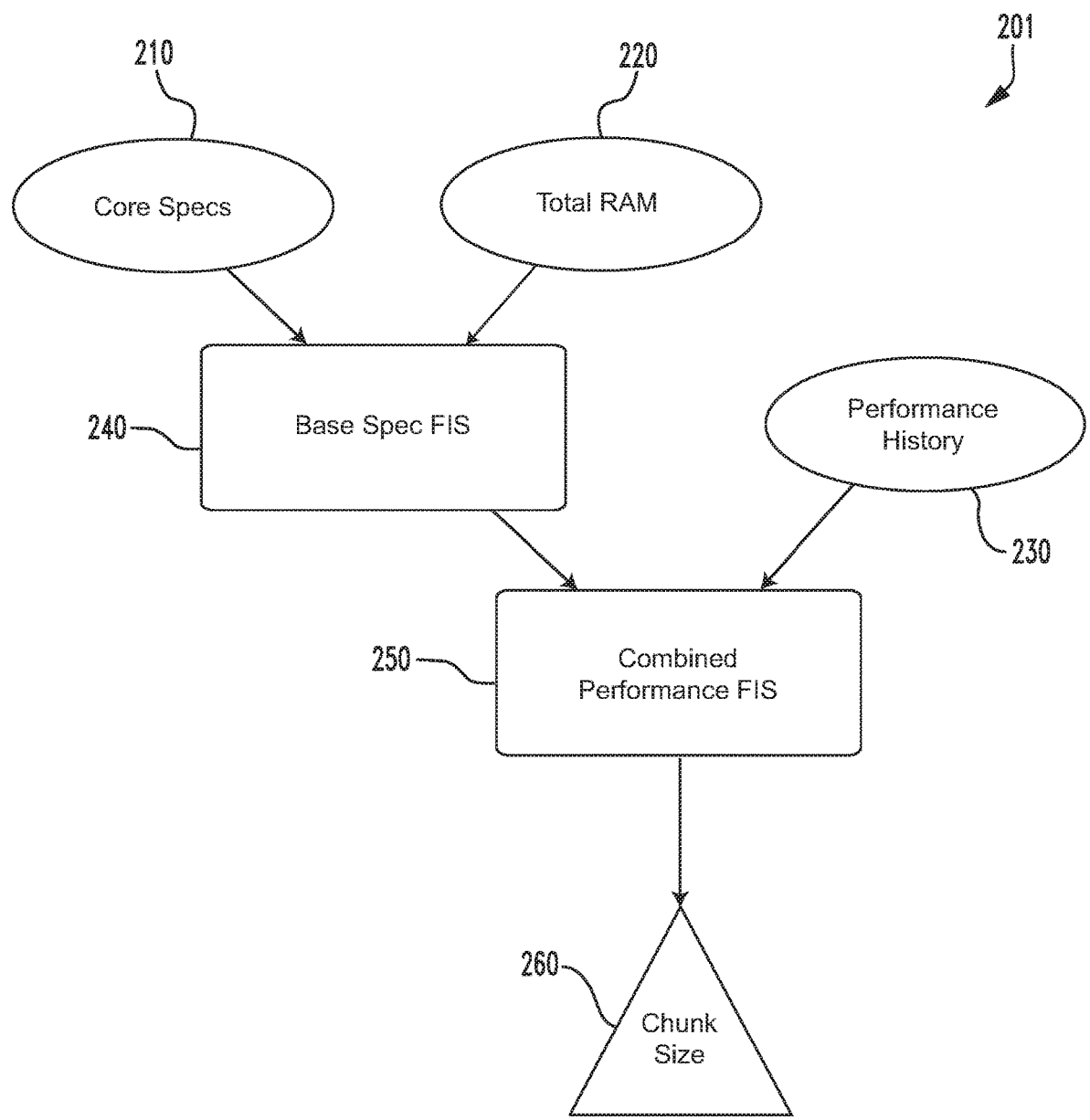
FIG. 2 is a flowchart illustrating a core FIS for determining chunk size in the system of FIG. 1.

Block 136 in FIG. 1 is shown in more detail in FIG. 2. This portion 201 of the system's Fuzzy Tree takes the base core specifications 210 and RAM specifications 220 of a client and provides an intermediate capacity evaluation through Base Specification FIS 240. (That intermediate capacity evaluation may be cached for use in subsequent processing.) This intermediate capacity evaluation is combined with the core's performance history 230 over the past five generations (if five generations have been evaluated yet) by Combined Performance FIS 250, which outputs the relative chunk size 260 that the system will assign to that client. Each chunk contains a set number of chromosomes to evaluate through the fitness function and then return back the fitness values for. Note that clients with multi-core CPUs will utilize each core in a parallel fashion, which is why it is typically the most computationally efficient to have chunk size>1. The overarching goal of Combined Performance FIS 250 is to intelligently assign the chromosomes such that all of the chunks finish processing at the same time, thus reducing the overall computational clock time for evaluating each generation.

Due to either client or network issues, the number of clients available to the system can vary during the run. Combined Performance FIS 250 takes into account recent performance history input 230 in order to adapt to those changes. Additionally, if a client takes more than three times the amount of time as the slowest returned client to return its fitness values (in some embodiments, these times are scaled to account for the relative size of assigned chunks), its chunk is re-assigned.

Returning to FIG. 1, the implementation of block 140, fitness data analysis, is rather simplistic in the illustrated implementation. After each fitness value is found, the average and best fitness are found for that generation (block 142). If this generation's best fitness is better than the previous best fitness found throughout all generations, that best-fitness value is updated (block 144). The changes in best and generational-average fitness values are recorded over a rolling window of generations (for example, for the past five generations) as well, and those values are utilized in the following section. If this was the last generation (block 146), the GA loop ends here and outputs the best chromosome and its fitness, as well as a save (serialization) of the last population (block 199). This allows the system to save and load runs, so many generations can be run on an AI without them needing to be run all at once. This has the additional benefit of saving back-ups in the case of power outages.

Block 150 begins the final section of GFT 101 and creates the new population for the next generation. Again, tournament polling style is utilized in this embodiment. The polling size will be determined as a function of the number of the generation, the initial parameters, the crossover rate, and the mutation rates. However, the next portion of the system's Fuzzy Tree, illustrated in FIG. 3, alters these parameters.

Figure 3:
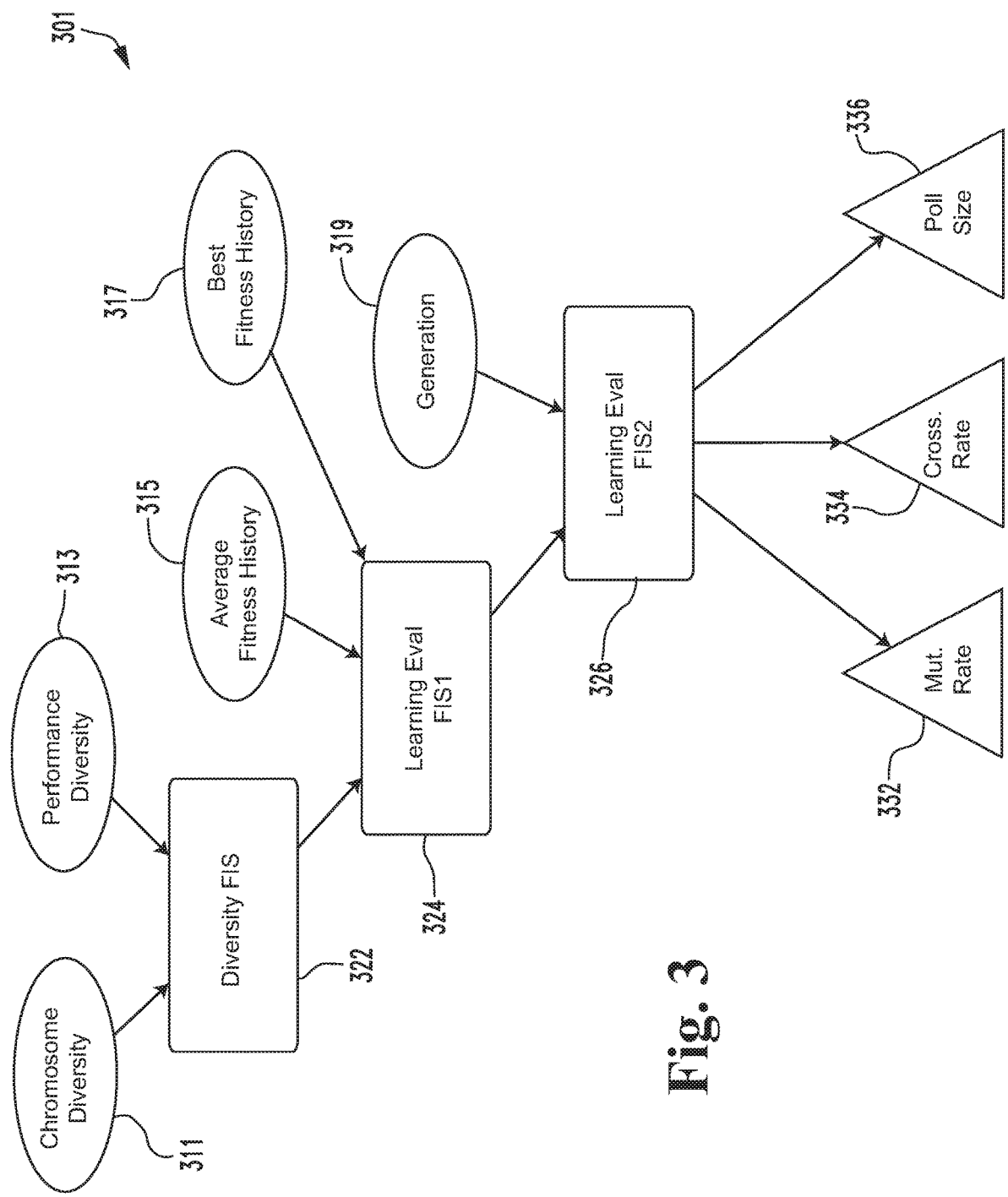
FIG. 3 is a flowchart illustrating the portion of the system of FIG. 1 that customizes parameters for the underlying GA.

Referring to FIG. 3 now, with continuing reference to FIG. 1, the higher-level GFT 101 creates a new population (block 150) using the Fuzzy Tree illustrated in FIG. 3 as tree portion 301. Diversity FIS 150 is first run (block 152), taking the diversity measurements of both the chromosomes themselves (block 311) as well as their respective fitness values (block 313). Here diversity is a measure of average differences, where 0 means every element is exactly the same, and 1 means that every element is different. In other embodiments, a variety of diversity metrics and scales may be applied here as will occur to those having ordinary skill in the art in view of this disclosure. Especially for certain problems, chromosomes could be radically different, but have very similar performances, which is why both measures are included in the feedback for some FISs. Diversity is a key part of some implementations of the present system, both for providing effective and meaningful results from breeding, as well as for avoiding the many undesirable local optima that are prominent in these types of problems.

The output of Diversity FIS 322 feeds the Learning Evaluation FISs (block 154), the first of which, Learning Evaluation FIS 1 324, takes the diversity output and the average (block 315) and best (block 317) fitness histories over the past five generations (or as many as there have been). The output of Learning Evaluation FIS 1 324 goes on to the final FIS in this branch of the Fuzzy Tree, Learning Evaluation FIS 2 326, as well as the number 319 of this generation, normalized between 0 and 1, where 0 corresponds to the first generation, and 1 corresponds to the last. The outputs are the change to the mutation rate 332, change to the crossover rate 334, and the change to tournament polling size 336, these changes being implemented at block 156. This is because, in the present embodiment, altering a predefined parameter is much more computationally efficient than creating a parameter. In many embodiments, this process drastically increases the performance of the present embodiment compared to a GA, and it does so in an unbiased manner, minimizing presumptions regarding the solution space of the AI that the system is optimizing.

Reproduction by breeding chromosomes gene-by-gene at block 158 occurs to produce an entirely new population in every generation. There is no elitism in the present implementation, meaning an entirely new population is created every generation, a result from the inventor's research into GAs (Ernest, Nicholas. "Genetic Fuzzy Trees for Intelligent Control of Unmanned Combat Aerial Vehicles." Electronic Thesis or Dissertation. University of Cincinnati, 2015. *OhioLINK Electronic Theses and Dissertations Center.* 6 Jul. 2015), though various embodiments will be more or less tolerant of repetition as will occur to those of ordinary skill in the art. A chromosome, when selected for breeding, goes through crossover and mutation gene by gene, where the exact mechanisms of the breeding type depend on the possible values the gene can take, as will be understood by those of ordinary skill in the art. This high-level GFT 101 continues until a new generation is created, and then the new population goes back to block 130 to repeat the process.

The system being disclosed has been used to create and optimize a host of GFTs, but the first GFT to use the system was the Learning-Enhanced Tactical Handling Algorithm (LETHA). LETHA is an AI that trains and controls next-generation Unmanned Combat Aerial Vehicles (UCAVs) through complex air-to-air and air-to-ground combat missions. The diagram for LETHA's utilization 401 of a control system according to the present disclosure is shown in FIG. 4.

Figure 4:
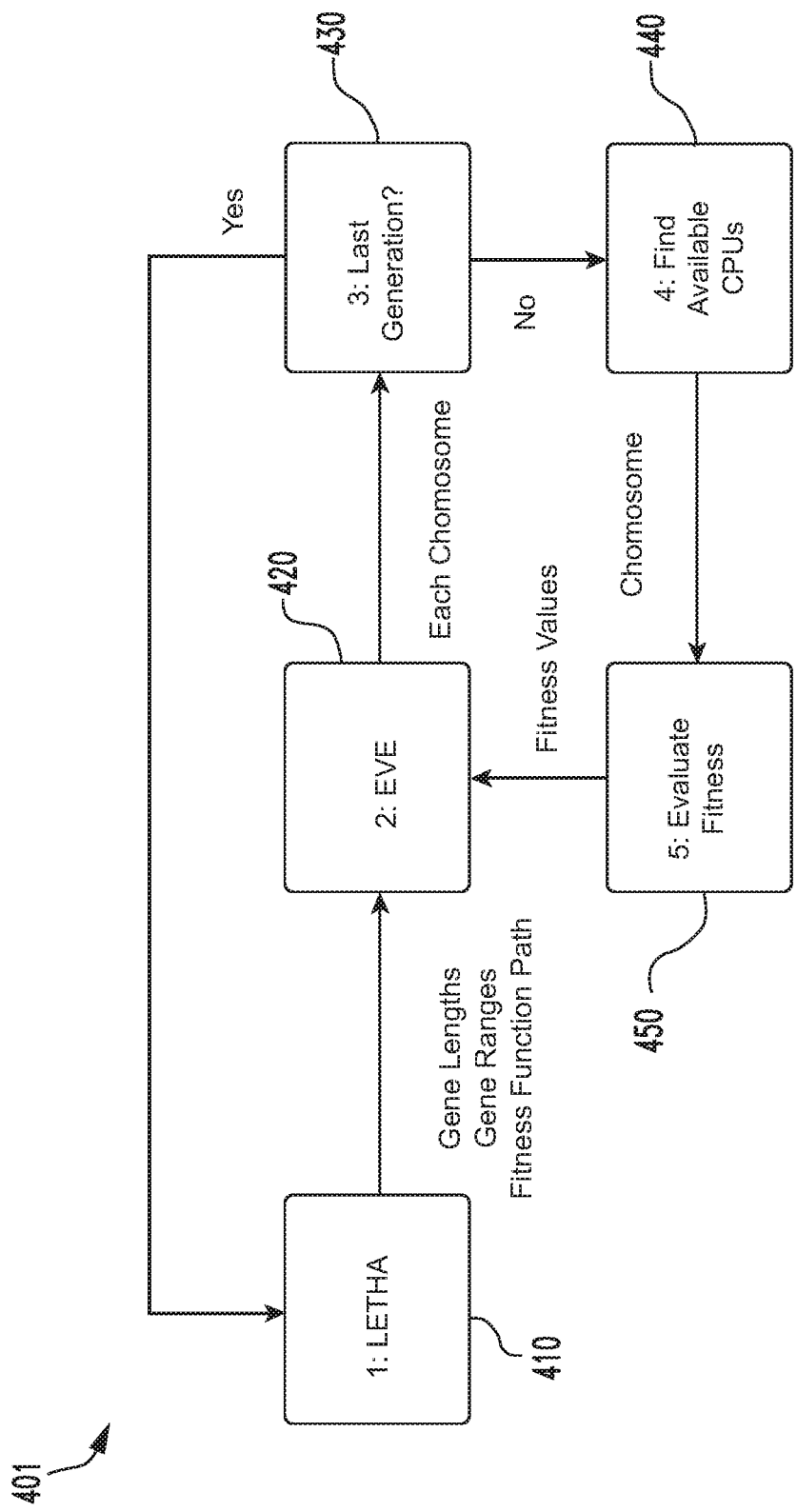
FIG. 4 is a flow diagram illustrating how an AI that trains and controls next-generation Unmanned Combat Aerial Vehicles (UCAVs) through complex air-to-air and air-to-ground combat missions uses a system according to FIG. 1.

As can be seen in system 401, illustrated in FIG. 4, due to the bookkeeping and structure of the present system, it is simple to implement such systems 401 when the AI is built to work in this context. LETHA 410 contains a multitude of FISs, including those for routing, weapon control, and electronic communications, as well as other algorithms for swarm cooperation and enemy missile identification, all of which are optimized by the present system. From 410, LETHA simply needs to give GFT system 420 the length of each gene, the values of each gene, and the file path to LETHA's fitness function (which is typically the same on all clients). GFT system 420 creates each chromosome in a first generation and uses them to create each chromosome in subsequent generations. The system 401 determines at block 430 whether the last generation has been processed. If not, the system 401 finds available CPUs at block 440 and distributes the evaluation of the fitness of each chromosome among them at block 450. The fitness values are returned to GFT system 420 for evaluation. When block 430 determines that the last generation has been processed, control values are returned to LETHA 410.

Another implementation 501 of a system according to the present disclosure demonstrates one of the invention's greatest strengths: its ability to run recursively. Initial studies used this technique to determine all of the initial parameters, as well as each FIS's rule bases and membership functions. The fitness function here was the score for each chromosome, which themselves are versions of the system, solving a sampling of classical machine learning problems (namely, a 50-city Traveling Salesman Problem, minimizing the Ackley function, and minimizing the Levi function). In this implementation, the fitness value for each chromosome was the best fitness found inside that chromosome's version of the system for each of these three tests.

Figure 5:
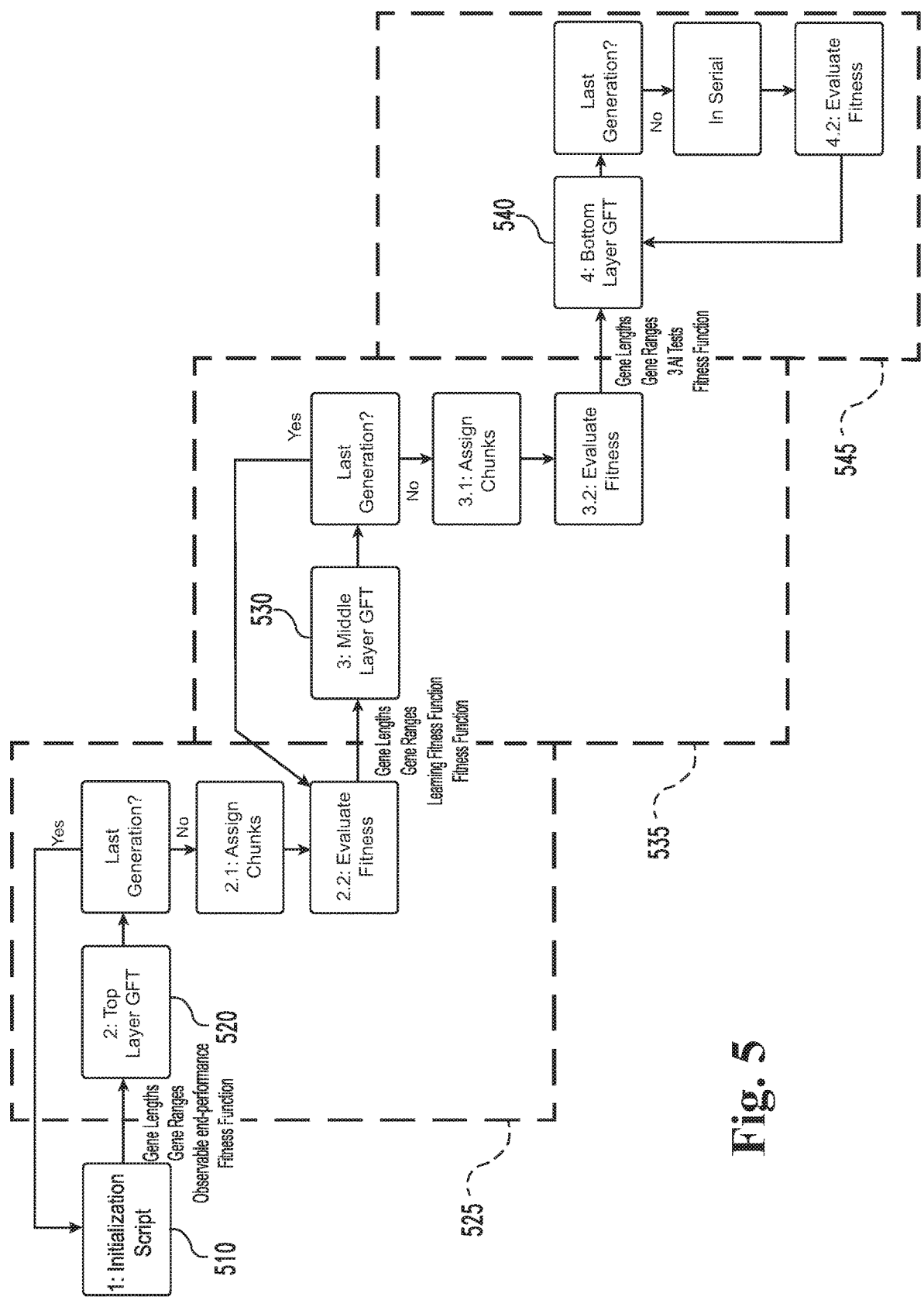
FIG. 5 is a meta-flowchart illustrating a double-recursive self-application of the system according to FIG. 1.

However, this may not be the best evaluation of how well an AI learns. The LEHTA system 401 had effectively taught GFT system 420 to learn in the manner that was defined. So in a subsequent implementation, all human assumptions were removed from the algorithm, and the GFT system ran recursively. This effectively was a GFT system learning how to evaluate how well another GFT system was learning. FIG. 5 depicts this process.

Through this process 501, the top-layer GFT subsystem 525, including GFT 520, is initialized with parameters from initialization script 510 defining the gene lengths, ranges, and a fitness function, which in this embodiment is simply the best score obtained by GFT subsystem 535 over a set number of generations on the tests provided. These genes change the fitness function of the middle-layer GFT 530, editing what GFT 530 values when it is determining "What is good learning and what is bad learning ability?" This fitness function is as follows:

$$Fitness = Gain_1 * (\text{Best Fitness Found from GFT 530 runs}) + Gain_2 * ((\text{Best Fitness*Generation Number where Best Fitness was Found})/\text{Number of total generations}) + Gain_3 * Sum(\text{Best Fitness–Average Fitness of each generation})$$

The gains here ($Gain_1$, $Gain_2$, and $Gain_3$) are what the top-layer GFT 520 determines. The first term corresponds simply to the best value middle-layer GFT 530 was able to find for the ultimate fitness function (in this example, solving the AI sample problems), weighted by coefficient $Gain_1$. The second term factors this best fitness value in with an optimization for finding this best solution in as few generations as possible, weighted by coefficient $Gain_2$. The third term is a weighted measure of performance diversity in the population at every generation.

Top-layer GFT subsystem 525 then calls the middle-layer GFT subsystem 535, including middle-layer GFT 530, providing this "learning evaluation" fitness function created by interpreting the genes in the top layer's (GFT subsystem 525's) chromosome, as well as gene lengths and ranges corresponding to variables in the primary problem definition (e.g., the Traveling Salesman Problem, Ackley Function, and Levi Function). In this example embodiment, the fitness function here in the middle-layer GFT subsystem 535 is the combined score in minimizing all three of these functions. In this embodiment, training is limited in terms of the number of generations, such that the bottom-layer GFT 540 in bottom-layer GFT subsystem 545 must find the optimal solution to all three of the sample problems in a very limited time. In other implementations, different exit criteria are defined (and, perhaps, controlled by the upper-layer GFTs).

This system 501 from FIG. 5 outputs an optimized fitness function for the GFT to evaluate how well the lower-level GFT 540 is learning. This fitness function can then be used in the system described in connection with FIGS. 1-3, where the GFT is only run recursively once, evaluating how well each chromosome, defining a combination of all initial parameters and FIS rule bases and membership functions, performs in learning the solution to the three AI tests. This ability can be used for testing additional features and can be continuously updated with additional sample problems to further refine the learning capabilities of the overall system.

Figure 6:
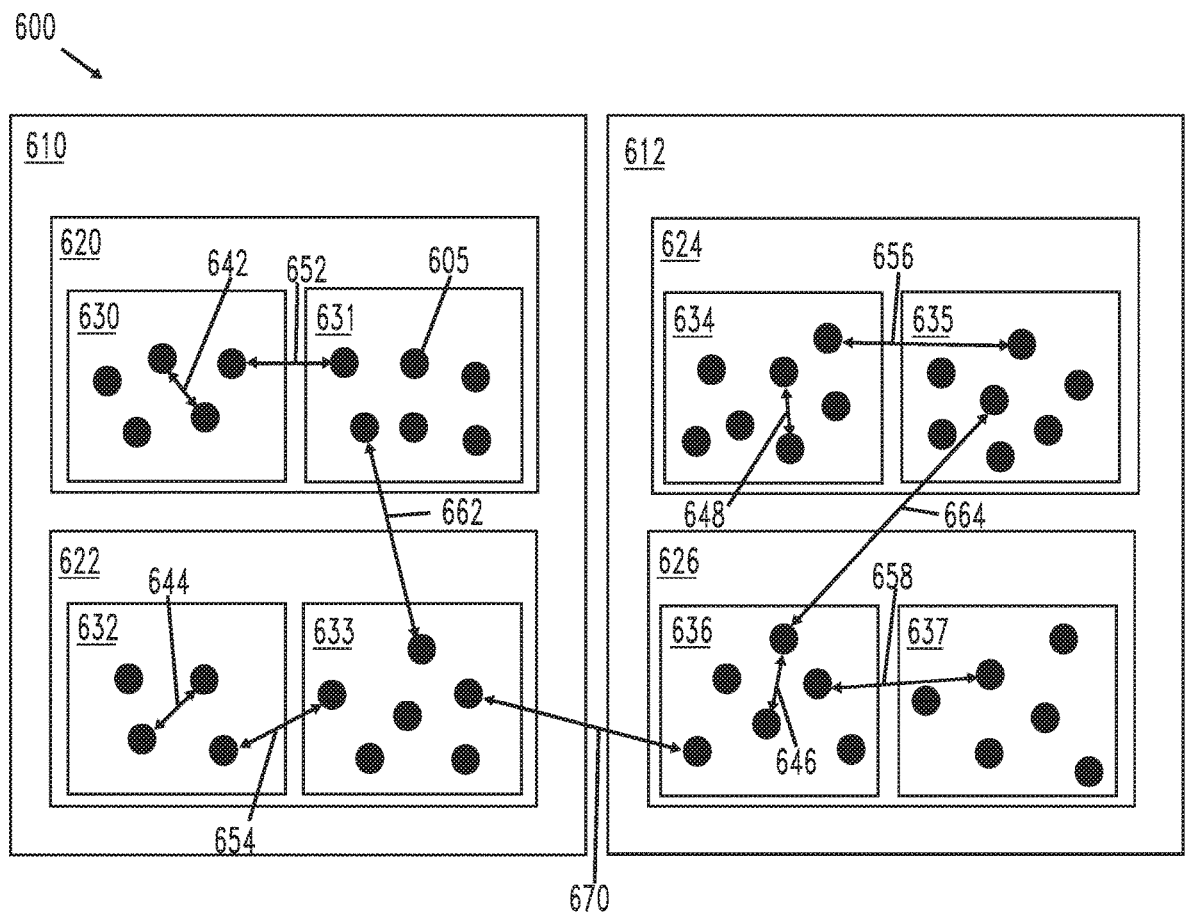
FIG. 6 is a schematic diagram of the structure of and cross-breeding between sub-populations in some systems according to FIG. 1.

As illustrated in one form in FIG. 6, some embodiments divide the universe 600 of chromosomes 605 into two or more "systems" 610, 612. In some of these embodiments, each "system" 610, 612 of chromosomes 605 is divided into two or more "planets" 620, 622, 624, 626 of chromosomes 605, and in some of them each "planet" 620, 622, 624, 626 of chromosomes 605 is divided into two or more "islands" 630, 631, 632, 633, 634, 635, 636, 637 of chromosomes 605. More or fewer levels of divisions and subdivisions are present in different embodiments as will occur to those skilled in the art, and in some cases as determined by higher-level GFTs that configure lower-level genetic algorithms.

As the lower-level genetic algorithm proceeds through its generations, chromosomes 605 within a particular "island" 630, 631, 632, 633, 634, 635, 636, 637 breed (642, 644, 646, 648) to produce the next generation of chromosomes 605 within that same "island." In some such embodiments, beginning in a certain generation of operation of the genetic algorithm, the populations of chromosomes 605 on "islands" 630, 631, 632, 633, 634, 635, 636, 637 are combined to the level of their "planet" 620, 622, 624, 626 and breed (652, 654, 656, 658) with chromosomes 605 on that same "planet" 620, 622, 624, 626 without regard for the "island" 630, 631, 632, 633, 634, 635, 636, 637 in which that chromosome 605 began.

Similarly, beginning in a certain generation of operation of the genetic algorithm, the populations of chromosomes 605 on "planets" 620, 622, 624, 626 are combined to the level of their "system" 610, 612 and breed (662, 664) with other chromosomes 605 in the same "system" 610, 612 regardless of the "planet" 620, 622, 624, 626 on which the chromosomes 605 began; and in a subsequent generation of the genetic algorithm, the populations of chromosomes 605 in the respective "systems" 610, 612 are combined to the level of "universe" 600 and breed (670) with other chromosomes 605 regardless of the "system," "planet," or "island" on which they began.

Figure 7:
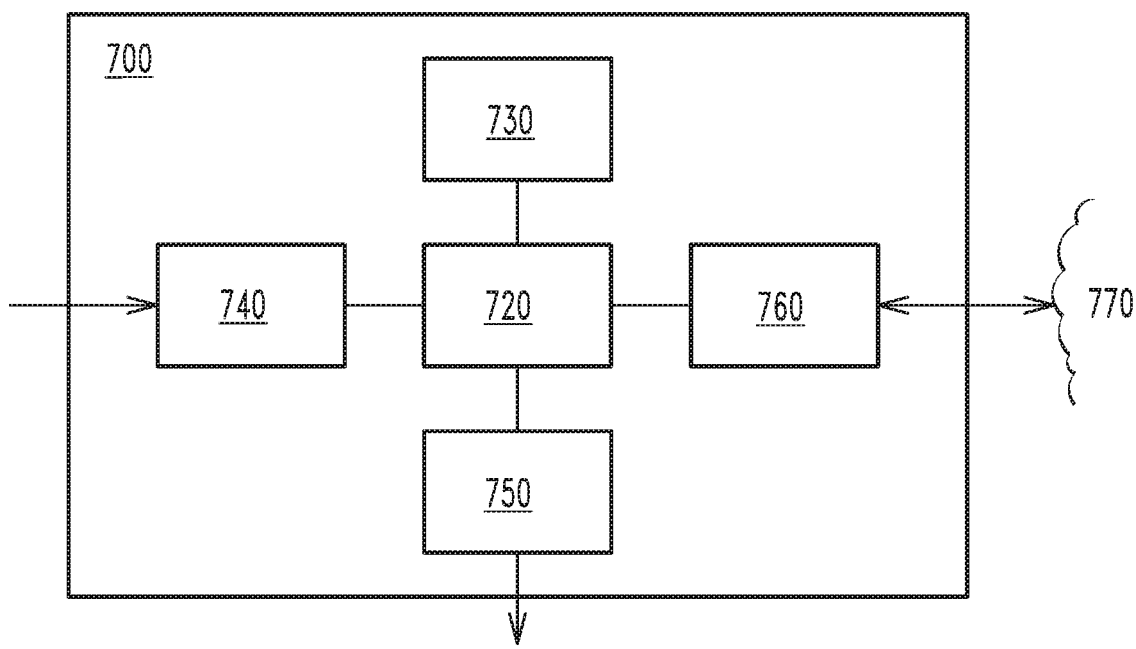
FIG. 7 is a schematic diagram of a computing device for use in various embodiments of the system of FIG. 1.

In some embodiments of the systems described herein, the computing resources/devices that are applied generally take the form of a mobile, laptop, desktop, or server-type computer, as mentioned above and as will occur to those skilled in the art. With reference to FIG. 7, the "computer" 700 (as this example will generically be referred to) includes a processor 720 in communication with a memory 730, optional input interface(s) 740, optional output interface(s) 750, and optional network interface 760. Memory 730 stores a variety of data, but is also encoded with programming instructions executable to perform the functions described herein. Power, ground, clock, and other signals and circuitry (not shown) are used as appropriate as will be understood and easily implemented by those skilled in the art.

The network interface 760 connects the computer 700 to a data network 770 for communication of data between the computer 700 and other devices attached to the network 770. Input interface(s) 740 manage communication between the processor 720 and one or more touch screens, sensors, pushbuttons, UARTs, IR and/or RF receivers or transceivers, decoders, or other devices, as well as traditional keyboard and mouse devices. Output interface(s) 750 provide signals to one or more output devices (not shown) such as one or more touch screens, LEDs, LCDs, or audio output devices, local multimedia devices, local notification devices, or a combination of these and other output devices and techniques as will occur to those skilled in the art.

The processor 720 in some embodiments is a microcontroller or general purpose microprocessor that reads its program from the memory 730. The processor 720 may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement, such as one or more $6^{th}$ Gen INTEL CORE i3, i5, or i7 processors from INTEL Corporation of 2200 Mission College Boulevard, Santa Clara, Calif. 95054, USA, or FX, Athlon X4, or A-Series processors from Advanced Micro Devices, One AMD Place, Sunnyvale, Calif. 94088, USA, while in others nontraditional or innovative data processing technology is used. In alternative embodiments, one or more reduced instruction set computer (RISC) processors, graphics processing units (GPU), application-specific integrated circuits (ASICs), general-purpose microprocessors, programmable logic arrays, or other devices may be used alone or in combinations as will occur to those skilled in the art.

Likewise, the memory 730 in various embodiments includes one or more types such as solid-state electronic memory, magnetic memory, or optical memory, just to name a few. By way of non-limiting example, the memory 730 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

Computer programs implementing the methods described herein will commonly be stored and/or distributed either on a physical distribution medium such as CD-ROM or pluggable memory module (for example, a flash memory device with a USB interface), or via a network distribution medium such as an internet protocol and/or cellular data network, using other media, or through some combination of such distribution media. From there, they will in some embodiments be copied to a hard disk, non-volatile memory, or a similar intermediate storage medium. When the programs are to be run, they are loaded either from their distribution medium or their intermediate storage medium into the execution memory of the computer, configuring the computer to act in accordance with the methods described herein. All of these operations are well known to those skilled in the art of computer systems.

The term "computer-readable medium" herein encompasses non-transitory distribution media, intermediate storage media, execution memory of a computer, and any other medium or device capable of storing a computer program implementing a method for later reading by a computer.

CONCLUSION

GFTs controlling GAs are a nearly universally applicable AI that can create or optimize other AIs. While the discussion above focused on applying GFTs controlling GAs to other GFTs, similar types of systems with many different genes in each chromosome, being applied to complex and computationally expensive fitness functions can be excellent applications of the disclosed systems as well. While there are various published GAs, the disclosed systems can serve the function of a GA in a GFT. However, through the addition in various embodiments of morphing parameters, near-universal applicability (by virtue of defining acceptable gene structures), and the inclusion of a fuzzy tree instead of purely relying on genetic operations, all optimized recursively as a GFT of GFTs, it is different from existing technology in many ways. As a final note, LETHA, again the first GFT created, initially utilized a GA. Prior to the creation of the presently disclosed system, LETHA's performance (success rate without casualties) in air combat missions is compared to LETHA's success rate after replacing the GA with the presently disclosed system in the following Table 2:

TABLE 2

| | LETHA GA Success Rates | |
|---|---|---|
| Test Mission | Manually Optimized Training | GFT-optimized Training |
| 1 | 93% | 100% |
| 2 | 98% | 100% |
| 3 | 96% | 100% |
| 4 | 99% | 100% |
| 5 | 100% | 99% |
| 6 | 91% | 98% |
| 7 | 100% | 100% |
| 8 | 92% | 100% |
| 9 | 94% | 100% |
| 10 | 100% | 100% |
| 11 | 97% | 100% |
| 12 | 94% | 99% |

Despite running for significant lengths of time, LETHA's GA could not reach the levels of performance of the GFT-optimized implementation. Through intelligent control of resource allocation, run time is also drastically faster utilizing the GFT-optimized implementation, and for these types of problems run time is a significant concern, as they are often just barely computationally feasible. Other applications utilize these systems' other capabilities, such as their ability to create genes with alphanumeric characters, ability to determine what fuzzy input should be utilized in what FIS in the Fuzzy Tree, and other unique requirements that are only met by various implementations of the disclosed systems.

Explicit Definitions

When used in the claims, "based on" should be understood to mean that something is determined at least in part by the thing that it is indicated as being "based on." When something is completely determined by a thing, it will be described as being "based exclusively on" the thing.

When used in the claims, "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims in the context of configuring a computer, "configure" should be understood to mean providing a computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc.).

When used in the claims or a definition, "data" should be understood to mean information which is represented in a form that is capable of being processed, stored and/or transmitted.

When used in the claims, "determine" should be understood to mean the act of generating, selecting or otherwise specifying something. For example, to obtain an output as the result of analysis would be an example of "determining" that output. As a second example, to choose a response from a list of possible responses would be a method of "determining" a response.

When used in the claims, "processor" should be understood to mean a device or group of devices which is capable of performing one or more logical and/or physical operations on data to produce a result.

All publications, prior applications, and other documents cited herein are hereby incorporated by reference in their entirety as if each had been individually incorporated by reference and fully set forth. While exemplary systems have been illustrated and described in detail in the drawings and foregoing description, the same is to be considered as illustrative and not restrictive in character, it being understood that only certain preferred embodiments have been shown and described and that all changes and modifications that come within the spirit of the invention are desired to be protected.

What is claimed is:

1. A computing system for improving the process of finding an optimum value of a function, comprising:
    a genetic algorithm subsystem of the computing system having a plurality of input parameters for operation of the genetic algorithm subsystem on a number of populations of chromosomes over a fitness function through a plurality of generations; and
    an optimizing engine in the computing system, wherein the optimizing engine comprises a fuzzy inference system and optimizes operation of the genetic algorithm subsystem by providing the plurality of input parameters to the genetic algorithm subsystem;
    wherein at least a first parameter in the plurality of input parameters determines a generation n, the populations at generation n comprise a first population and a second population, and the genetic algorithm subsystem implements at least one of
        consolidation of the first population and the second population into a combined population at generation n+1, or
        separation of the first population into a plurality of populations at generation n+1.

2. The computing system of claim 1, further comprising a fuzzy genetic algorithm implemented in the computing system, where the fuzzy genetic algorithm has an initial plurality of chromosomes and is configured to, for each iteration in a plurality of iterations:
    identify a plurality of chromosomes for the iteration
        in a first iteration, as a function of the initial plurality of chromosomes, and
        in subsequent iterations after the first iteration, as a function of the fitness function and results of the previous iteration; and
    for each of the plurality of chromosomes,
        as a function of the chromosome, provide a set of inputs to the optimizing engine to produce the plurality of parameters;
        operate the genetic algorithm subsystem as a function of the plurality of parameters; and
        evaluate the operation of the genetic algorithm subsystem according to the fitness function.

3. The computing system of claim 2, wherein the input parameters to the genetic algorithm subsystem comprise a rule base to be used by the fuzzy logic controller.

4. The computing system of claim 2, wherein:
    the optimizing engine takes as an input the value of a diversity metric as applied to at least one of the generations of chromosomes.

5. The computing system of claim 2, wherein:
    identification of the next plurality of chromosomes by the fuzzy genetic algorithm is performed as a function of the performance history of the genetic algorithm subsystem, where the performance history comprises data regarding time taken to calculate the fitness function over one or more chromosomes; and
    the optimizing engine takes specifications of computing resources as input.

6. The computing system of claim 1, wherein the optimizing engine changes the parameters for operation of the genetic algorithm subsystem between generations of operation of the genetic algorithm subsystem.

7. The computing system of claim 1, wherein a second parameter in the plurality of parameters provided by the optimizing engine determines an amount of crossover between a first population and a second population at generation m to produce a first population and a second population at generation m+1.

* * * * *